United States Patent
Lee et al.

(10) Patent No.: US 9,990,911 B1
(45) Date of Patent: Jun. 5, 2018

(54) METHOD FOR CREATING PREVIEW TRACK AND APPARATUS USING THE SAME

(71) Applicant: BUZZMUISQ INC., Santa Monica, CA (US)

(72) Inventors: Jungsuk Lee, Seoul (KR); Keunwoo Choi, Pocheon-si (KR); Tae Hoon Kim, Seoul (KR); Gukhyeon Gyeong, Seongnam-si (KR); Uk Her, Seoul (KR); Sungho Lee, Seoul (KR)

(73) Assignee: BUZZMUISQ INC., Santa Monica, CA (US)

( * ) Notice: Subject to any disclaimer, the term of this patent is extended or adjusted under 35 U.S.C. 154(b) by 0 days. days.

(21) Appl. No.: 15/607,285

(22) Filed: May 26, 2017

(30) Foreign Application Priority Data

May 4, 2017 (KR) .......................... 10-2017-0056868

(51) Int. Cl.
| | |
|---|---|
| *G10H 1/40* | (2006.01) |
| *G10H 1/00* | (2006.01) |
| *G11B 27/031* | (2006.01) |
| *G11B 27/32* | (2006.01) |
| *G06F 17/30* | (2006.01) |

(52) U.S. Cl.
CPC ..... *G10H 1/0008* (2013.01); *G06F 17/30743* (2013.01); *G06F 17/30772* (2013.01); *G06F 17/30775* (2013.01); *G11B 27/031* (2013.01); *G11B 27/32* (2013.01); *G10H 2210/061* (2013.01); *G10H 2210/066* (2013.01); *G10H 2210/071* (2013.01); *G10H 2210/076* (2013.01); *G10H 2210/125* (2013.01)

(58) Field of Classification Search
CPC .............. G10H 1/40; G10H 2210/076; G10H 2210/071; G10H 2210/056; G10H 2210/031; G10H 1/361; G10H 2210/341; G10H 2220/086; G10H 2210/366; G10H 2210/131; G10H 2210/371; G10H 2210/136; G10H 2220/081; G10D 13/02
See application file for complete search history.

(56) References Cited

U.S. PATENT DOCUMENTS

| | | | |
|---|---|---|---|
| 8,471,135 B2 * | 6/2013 | Taub | ......................... G10H 1/00 84/609 |
| 8,666,749 B1 | 3/2014 | Subramanya et al. | |
| 9,691,429 B2 * | 6/2017 | Leiberman | ........... G11B 27/031 |
| 9,743,033 B2 * | 8/2017 | Kim | ......................... H04N 5/93 |

(Continued)

OTHER PUBLICATIONS

M. A. Bartsch et al.: "To Catch a Chorus: Using Chroma-Based Representations for Audio Thumbnailing", Applications of Signal Processing to Audio and Acoustics, 2001 IEEE Workshop.

(Continued)

*Primary Examiner* — Marlon Fletcher
(74) *Attorney, Agent, or Firm* — AEON Law, PLLC; Adam L.K. Phillip; Manasi Vakil

(57) ABSTRACT

Disclosed herein is a method for creating a preview track. The method includes: acquiring a plurality of tracks; extracting rhythm data from each of the tracks; determining a plurality of extracted parts each corresponding to the respective tracks based on the extracted rhythm data; cutting out the extracted parts from the respective tracks; and connecting the extracted parts with one another to create a preview track.

17 Claims, 14 Drawing Sheets

(56) References Cited

U.S. PATENT DOCUMENTS

| | | | | |
|---|---|---|---|---|
| 2002/0069218 A1* | 6/2002 | Sull | G06F 17/30796 | 715/202 |
| 2003/0146915 A1* | 8/2003 | Brook | G11B 27/11 | 345/473 |
| 2007/0083496 A1* | 4/2007 | Martinez | G06F 21/10 | |
| 2007/0083762 A1* | 4/2007 | Martinez | G06F 17/30026 | 713/176 |
| 2009/0100093 A1 | 4/2009 | Makipaa | | |
| 2009/0217804 A1* | 9/2009 | Lu | G10H 1/0058 | 84/602 |
| 2010/0205222 A1* | 8/2010 | Gajdos | G06F 17/30743 | 707/803 |
| 2010/0223314 A1* | 9/2010 | Gadel | G11B 27/034 | 709/200 |
| 2011/0113051 A1* | 5/2011 | Lindahl | G06F 17/30029 | 707/758 |
| 2013/0275421 A1* | 10/2013 | Resch | G10H 1/0008 | 707/725 |
| 2014/0229831 A1* | 8/2014 | Chordia | G06F 3/0482 | 715/717 |
| 2014/0314391 A1* | 10/2014 | Kim | G11B 27/11 | 386/248 |
| 2014/0320697 A1* | 10/2014 | Lammers | H04N 5/76 | 348/231.99 |
| 2015/0340021 A1 | 11/2015 | Sheffer et al. | | |
| 2015/0341591 A1* | 11/2015 | Kelder | H04N 7/013 | 386/285 |
| 2015/0373455 A1* | 12/2015 | Donaldson | G10L 15/08 | 381/79 |
| 2016/0336039 A1* | 11/2016 | Leiberman | G11B 27/031 | |
| 2016/0342594 A1* | 11/2016 | Jehan | G06F 7/36 | |
| 2017/0125057 A1* | 5/2017 | Chordia | G11B 27/031 | |

OTHER PUBLICATIONS

Yale Abdullah: "Composition Tools: Tempo & Delay calculations /Rhymes chart" URL: http://web.archive.org/web/20160415171721 URL: http://www.angelfire.com/in2/yala/9mustool.htm.

* cited by examiner

US 9,990,911 B1

METHOD FOR CREATING PREVIEW TRACK AND APPARATUS USING THE SAME

CROSS-REFERENCE TO RELATED APPLICATIONS

This application claims the priority of Korean Patent Application No. 10-2017-0056868 filed on May 4, 2017, in the Korean Intellectual Property Office, the disclosure of which is incorporated herein by reference.

BACKGROUND

Technical Field

The present disclosure relates to a method for creating a preview track and an apparatus using the same.

Description of the Related Art

There are a variety of ways to listen to streaming music via applications. Basically, a user may select music tracks she/he wants in a music streaming application and listen to the selected music tracks. Alternatively, the user may listen to music tracks by selecting a playlist including one or more music tracks prepared in advance by another user or in a music application.

For example, FIGS. 1A and 1B are views showing existing devices for providing music playlists. Referring to FIG. 1A, a conventional mobile device 10 is shown on which a music streaming application is running. The mobile device 10 includes a display unit 12 for graphically presenting a music streaming application. The display unit 12 may display playlists A and B (14 and 16) which are played recently, and playlists X and Y (22 and 24) which are recommended based on the recently played music tracks. FIG. 1B shows a page after one of the displayed playlists has been selected. Once one of the playlists is selected, the information on the music tracks 32 and 34 included in the playlist may be displayed.

Still, from the pages shown in FIGS. 1A and 1B, the user can only guess what kind of music tracks are included in the playlist based on the names until the user plays the playlist. Even though the page shown in FIG. 1B displays the information on the tracks included in the playlist, the user cannot easily determine whether the tracks are of the kind she/he wants unless she/he already knows about the music tracks. Accordingly, with existing music streaming applications, the user cannot determine whether a playlist includes music tracks she/he wants, before she/he plays the playlist.

The statements in this section merely provide background information related to the present disclosure and may not constitute prior art.

SUMMARY

The inventors of the application have realized that by creating and providing a preview track, a user can know what kind of music tracks are included in a playlist even without playing the playlist.

In view of the above, the inventors of the application have conceived and developed a method for creating a preview track by extracting a part of each of a plurality of music tracks, which sounds natural with rhythm and exhibits characteristics of the music tracks.

In view of the above, an object of the present disclosure is to provide a method for creating a preview track by which a characteristic part of each of music tracks is extracted to create a consecutive preview track that are naturally connected with one another, and a device using the same.

Another object of the present disclosure is to provide a method for creating a preview track by which a playlist can be described more effectively by providing an edited video and visual effects in association with the preview track, and a device using the same.

It should be noted that objects of the present disclosure are not limited to the above-described objects, and other objects of the present disclosure will be apparent to those skilled in the art from the following descriptions.

According to an aspect of the present disclosure, there is provided a method for creating a preview track. The method includes: acquiring a plurality of tracks; extracting rhythm data from each of the tracks; determining a plurality of extracted parts each corresponding to the respective tracks based on the extracted rhythm data; cutting out the extracted parts from the respective tracks; and connecting the extracted parts with one another to create a preview track.

The method may further include: before the acquiring the plurality of tracks, selecting a set of tracks; providing recommended tracks based on the set of tracks; and selecting another set of tracks from among the recommended tracks, wherein the acquiring the plurality of tracks comprises acquiring the plurality of tracks from the set of tracks or the another set of the tracks.

The method may further include: detecting a representative part from each of the tracks, wherein the determining the plurality of extracted parts comprises determining the plurality of extracted parts in the representative part, and wherein the cutting out the extracted parts comprises cutting the extracted parts out of the representative part.

The extracting the rhythm data may include separating percussive components from each of the plurality of tracks; detecting an onset of the percussive components; and detecting a kick and/or a snare from the percussive components based on the onset The extracting the rhythm data may include determining a tempo based on the onset or the percussive components.

The determining the plurality of extracted parts may include determining a part in a bar predetermined based on the tempo as the extracted parts.

The determining the plurality of extracted parts may include determining based on the tempo a part for a predetermined number of bars as the extracted parts.

The determining the plurality of extracted parts may include determining the plurality of extracted parts based further on whether a voice is included in each of the plurality of tracks or on a pitch of a voice if any.

The creating the preview track may include creating the preview track such that it has a series of consecutive bits.

Each of the plurality of tracks may be a highlight track.

The method may further include: creating an edited video by connecting a plurality of videos with one another, each corresponding to the respective extracted parts in the preview track.

The method may further include: synchronizing visual effects with the plurality of videos based on the rhythm data.

The creating the edited video may include determining whether a voice is included in each of the plurality of tracks, and applying visual effects to the plurality of videos based on a pitch of a voice, if any.

According to another aspect of the present disclosure, there is provided a device for creating a preview track. The device includes: a communications unit configured to receive a plurality of tracks; a processor operably connected to the communications unit and configured to: acquire the plurality of tracks from the communications unit; extract rhythm data from each of the tracks; determine a plurality of extracted parts each corresponding to the respective tracks based on the extracted rhythm data; cut the plurality of extracted parts out of the respective tracks, and connect the extracted parts with one another to create a preview track; and an output unit configured to output the preview track.

The processor may be configured to: separate percussive components from each of the plurality of tracks; detect an onset of the percussive components; and detect a kick and/or a snare in the percussive components based on the onset to extract the rhythm data.

The processor may be configured to extract the rhythm data by determining a tempo based on the onset or the percussive components.

The processor may be configured to determine based on the tempo a part for a predetermined number of bars as the extracted parts.

The preview track may have a series of consecutive bits.

The processor may be further configured to: create an edited video by connecting a plurality of videos with one another, each corresponding to the respective extracted parts in the preview track.

The details of one or more embodiments of the subject matter described in this specification are set forth in the accompanying drawings and the description below.

According to an exemplary embodiment of the present disclosure, a consecutive preview track can be created by extracting characteristics parts from a plurality of music tracks based on rhythm data, such that the preview track can sound natural to a user.

In addition, according to an exemplary embodiment of the present disclosure, a playlist can be described more effectively by providing visual effects in association with a preview track, thereby providing improved user experience.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1A:
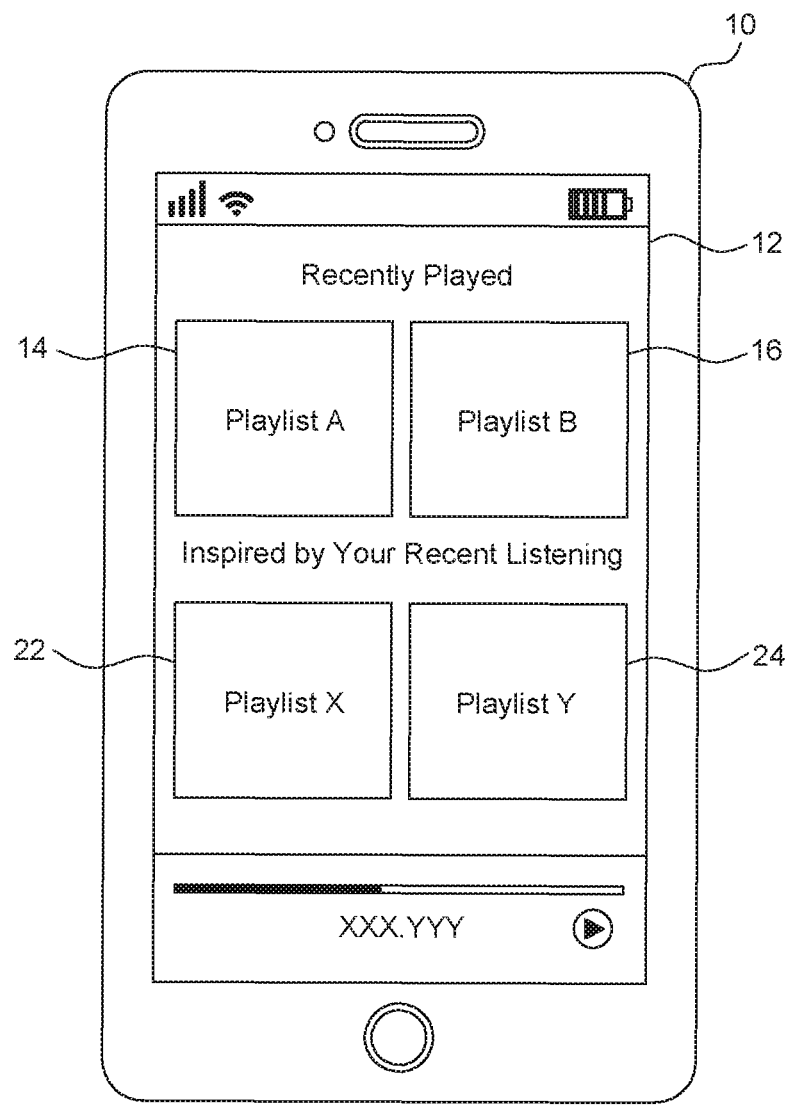
FIGS. 1A and 1B are views showing an existing method for providing music playlists.
Figure 1B:
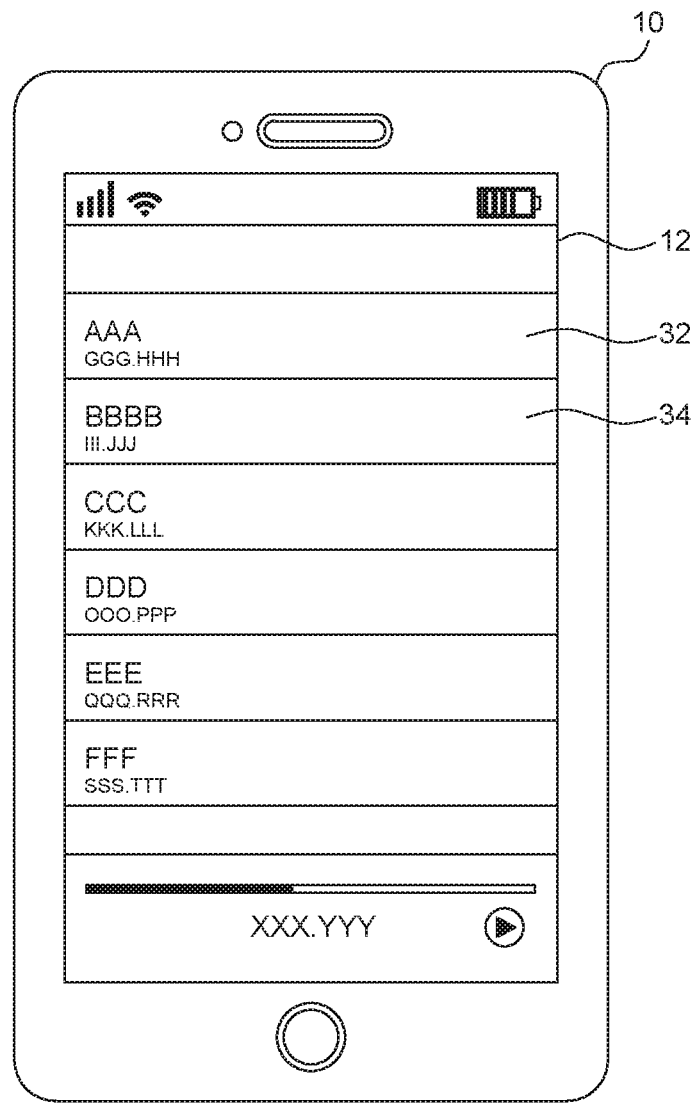

Advantages and features of the present disclosure and methods to achieve them will become apparent from the descriptions of exemplary embodiments hereinbelow with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

Although terms such as first, second, etc. are used to distinguish arbitrarily between the elements such terms describe and these terms are not necessarily intended to indicate temporal or other prioritization of such elements. Theses terms are used to merely distinguish one element from another. Accordingly, as used herein, a first element may be a second element within the technical scope of the present invention.

Like reference numerals denote like elements throughout the descriptions.

Features of various exemplary embodiments of the present disclosure may be combined partially or totally. As will be clearly appreciated by those skilled in the art, technically various interactions and operations are possible. Various exemplary embodiments can be practiced individually or in combination.

Herein, the type of the device for creating a preview track according to exemplary embodiments of the present disclosure is not particularly limited as long as it can play a plurality of music tracks. For example, a device or an apparatus for creating a preview track may include a general purpose computer, a laptop computer, a network-connected storage, a streaming server, a mobile device (e.g., an MP3 player, a tablet device, a smartphone), etc. In addition, the software for playing tracks installed in the device is not particularly limited as long as it can provide tracks as playlists, and may include a music streaming application and a stored music playback application, etc. Hereinafter, for convenience of illustration, the device for creating a preview track will be described as a mobile device in which a music streaming application is installed. However, it is to be understood that exemplary embodiment of the present disclosure can be implemented in various ways. Herein, a track may refer to a unit of continuous sound data representing one piece of music or sound. For example, a track may refer to a file. In the following description, a track is described as a unit representing a piece of music. However, it is to be understood that a track is a unit containing sound data.

Hereinafter, exemplary embodiments of the present disclosure will be described in detail with reference to the accompanying drawings.

Figure 2:
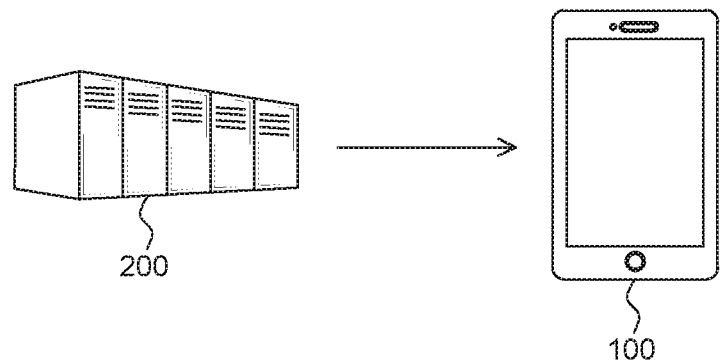
FIG. 2 is a view schematically showing a device for creating preview tracks according to an exemplary embodiment of the present disclosure.

FIG. 2 is a view schematically showing a device for creating a preview track according to an exemplary embodiment of the present disclosure. Referring to FIG. 2, a device 100 for creating a preview track represented by a mobile device, and a music streaming server 200 are shown. The device 100 for creating a preview track may receive music from the music streaming server 200 and output the music through an audio output unit. The device 100 for creating a preview track may request from the music streaming server 200 to stream one of the tracks in the playlist including a plurality of tracks. In response to the request, the music streaming server 200 may provide a piece of music. The device 100 for creating a preview track may configure a playlist with some of the tracks accessible from the music streaming server 200 and may extract some of the tracks included in the playlist to create a preview track. The preview track thus created are played before the user plays the entire playlist, allowing the user to easily know what songs have been included in the playlist even if she/he does not play it.

Figure 3:
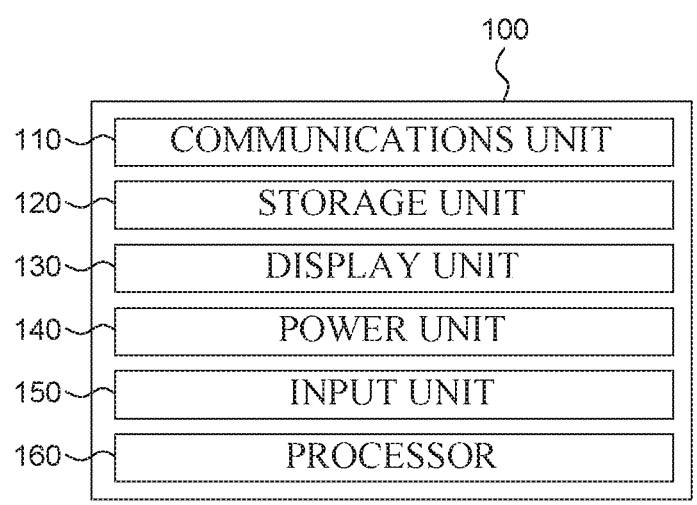
FIG. 3 is a block diagram for illustrating a device for creating preview tracks according to an exemplary embodiment of the present disclosure.

FIG. 3 is a block diagram for illustrating a device for creating a preview track according to an exemplary embodiment of the present disclosure. The device 100 for creating a preview track includes a communications unit 110, a storage unit 120, a display unit 130, a power unit 140, an input unit 150 and a processor 160.

The communications unit 110 connects the music streaming server to the device 100 for creating a preview track so that they can communicate with one another. In addition, the communications unit 110 may request the music streaming server for sound data, album cover data, lyric data, and music image data of tracks, or may request to play tracks in real-time. The communications unit 110 may receive various data items provided in response to the request. In addition, the communications unit 110 may transmit data associated with the created preview track to the music streaming server.

The storage unit 120 may store data received through the communications unit 110 and the data associated with the created preview track. In addition, the storage unit 120 may store an application for creating and providing a preview track.

The display unit 130 displays an interface of the application for creating and providing a preview track. The display unit 130 is a display device including a liquid-crystal display device, an organic light-emitting display device, and the like. The display unit 130 may be implemented in various forms or methods other than those listed above, as long as it can achieve the objects of the present disclosure. The power unit 140 may supply power to the device 100 for creating a preview track.

The input unit 150 may be, but is not limited to, a keyboard, a mouse, a touch screen panel, and the like. The tracks to be included in the playlist may be selected through the input unit 150, and the preview track consisting of the selected tracks can be selected. Although not shown in FIG. 3, the device 100 for creating a preview track may further include an audio output unit for outputting a preview track.

The processor 160 is operatively connected to the communications unit 110, the storage unit 120, the display unit 130, the power unit 140, and the input unit 150 and executes various commands for operating applications. Hereinafter, an operation for creating a preview track will be briefly described. The processor 160 acquires a plurality of tracks through the communications unit 110. Then, the processor 160 extracts rhythm data from each of the tracks, and determines a plurality of extracted parts each corresponding to the respective tracks based on the extracted rhythm data.

When the extracted parts are determined, the extracted parts are cut out of the respective tracks, and a preview track is created by connecting the extracted parts.

Since the preview track is created by extracting the parts out of the respective tracks based on the rhythm data, the preview track can sound natural to a user even though it is created with different music tracks.

Figure 4:
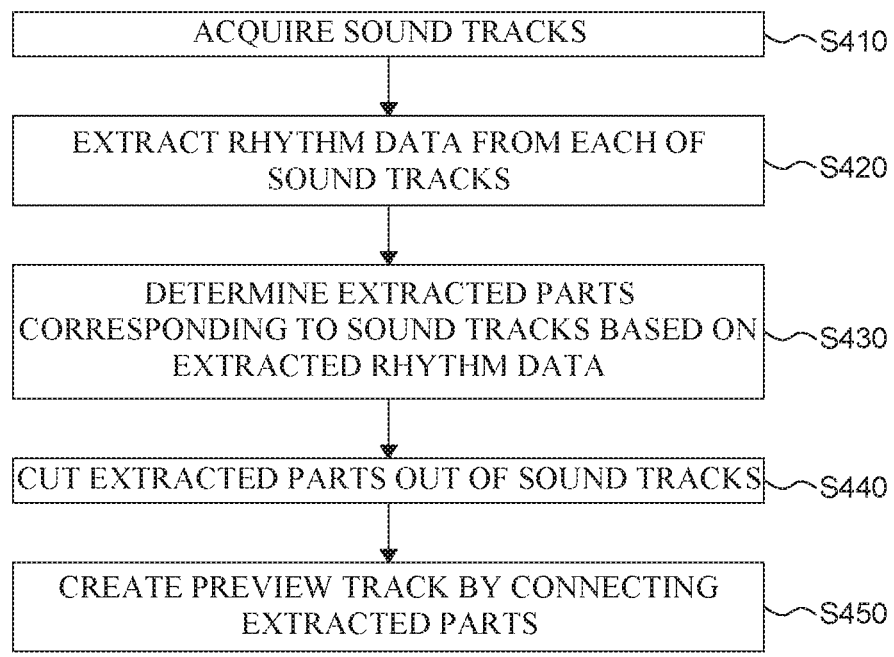
FIG. 4 is a flowchart for illustrating a method for creating a preview track according to an exemplary embodiment of the present disclosure.
Figure 5:
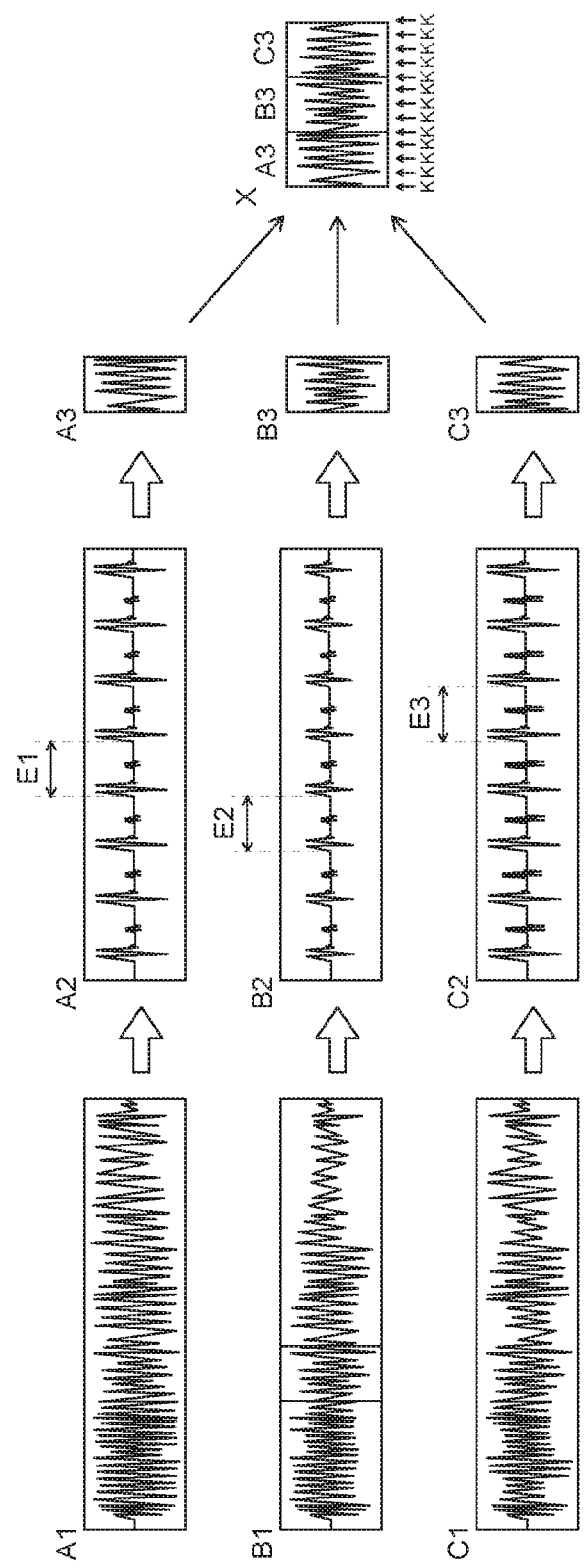
FIG. 5 is a view for illustrating a process of creating a preview track in the method according to the exemplary embodiment of the present disclosure.

Hereinafter, a method for creating a preview track will be described in more detail with reference to FIGS. 4 and 5. FIG. 4 is a flowchart for illustrating a method for creating a preview track according to an exemplary embodiment of the present disclosure. FIG. 5 is a view for illustrating a process of creating a preview track in the method according to the exemplary embodiment of the present disclosure. For convenience of illustration, description will be made with reference to the elements shown in FIG. 3.

Initially, a plurality of tracks is acquired (step S410). For example, the plurality of tracks may be received from the music streaming server through the communications unit 110 and temporarily stored in the storage unit 120. To receive the plurality of tracks from the music streaming server, an access permission may be required from the music streaming server. Then, an authentication process may be further required at the music streaming server. In various embodiments of the present disclosure, the track may be an entire track having the full length, or may be a highlight track having only a portion of the length provided by the music streaming server, for example. Alternatively, the track may be a representative part including a refrain of a music track. Referring to FIG. 5, a plurality of tracks A1, B1 and C1 is displayed.

Subsequently, rhythm data is extracted from each of the plurality of tracks (step S420). Extraction of rhythm data may mean separating and detecting percussive components from each of the tracks. The algorithm for separating percussive components is not particularly limited, and all available algorithms can be used. For example, a separation algorithm using MFCC (mel-frequency cepstral coefficient) and chroma characteristic vector, a separation algorithm using NMF (nonnegative matrix factorization), a separation algorithm using median filtering, and a separation algorithm using neural networks may be employed. The rhythm data may include signals such as a kick, a snare, a hi-hat, a symbol and a tom-tom. In addition, the rhythm data may include the position of each signal and its intensity. Referring to FIG. 5, each of rhythm data items A2, B2 and C2 may be represented by a series of signals.

Once the rhythm data is extracted, a plurality of extracted parts corresponding to the respective plurality of tracks is determined based on the extracted rhythm data (step S430). For example, the extracted parts may be determined as a portion from the beginning of a kick to the end of a bar in the rhythm data. The extract parts are determined based on the rhythm data in order to detect at least the beginning of a bar based on the position and intensity of the rhythm data such that the extract parts start at the beginning of the bar. If the extracted parts are determined without considering the rhythm data, the extracted parts may not start with the beginning of the bar, such that the preview track may not sound natural. Referring to FIG. 5, time range E1, E2 and E3 of the extracted parts are determined in each of the rhythm data A2, B2 and C2. The time ranges E1, E2 and E3 of the extracted parts may be determined, for example, from an onset of the part recognized as a kick in the rhythm data. The time ranges of the extracted parts may be set to be earlier than the beginning of a bar and/or later than the end of the bar, such that it includes the bar.

In various exemplary embodiments of the present disclosure, the determining the extracted parts from the respective tracks based on the extracted rhythm data may include determining whether there is a voice in each of the tracks. For example, if the extracted parts do not include a voice, the extracted parts may be determined again, or the extracted part may be determined so that it includes a voice. Alternatively, if there is a voice, a plurality of extracted parts may be determined based additionally on the pitch of the voice. For example, since a part with a high pitch of voice may be likely to be the highlight of the track, the extracted parts may be determined based on the rhythm data in the part with a high pitch of voice rather than a part with a low pitch of voice. Further, the extracted parts may be determined based on the dub of the voice, on whether there is the background vocal, and on the velocity or volume.

Once the time ranges for the extracted parts are determined, the extracted parts are cut out of the respective tracks (step S440). Since no other part than the extracted parts is played in the preview track, only the parts corresponding to the time ranges E1, E2 and E3 of the extracted parts may be cut out of the respective tracks A1, B1 and C1. The cut-out parts may be temporarily stored in the storage unit 120. Referring to FIG. 5, the cut-out, extracted parts A1, B3 and C3 are shown. The cut-out, extracted parts are connected with one another to create a preview track (step S450). Referring to FIG. 5, the preview track X is shown, in which the extracted parts A3, B3 and C3 are consecutively connected with one another. The order in which they are connected with one another may be determined in the playlist. In FIG. 5, the end of one of the extracted parts A3, B3 and 0C3 is connected to the end of another in the preview track X, but this is not limiting. For example, the extracted parts A3, B3 and C3 may overlaps with one another. For example, the bit at the end of the extracted part A3 coincides and overlaps with the bit at the beginning of the extracted part B3, and the end of the extracted part A3 fades out and the beginning of the extracted part B3 fades in. The preview track X may be stored as a single file. The stored track may be transmitted back to the streaming server or to another server for sharing. Since the preview track is created by using the rhythm data, for example, by connecting the extracted parts each having a bar starting with a kick, the preview track may have a series of consecutive kicks K. Thus, the preview track is composed of a plurality of bars and the plurality of bars has a series of consecutive bits, the preview track can sound natural to the user. In various embodiments of the present disclosure, fade-in or fade-out effects may be applied at the beginning and the end of each extracted parts for more natural effects.

Figure 6:
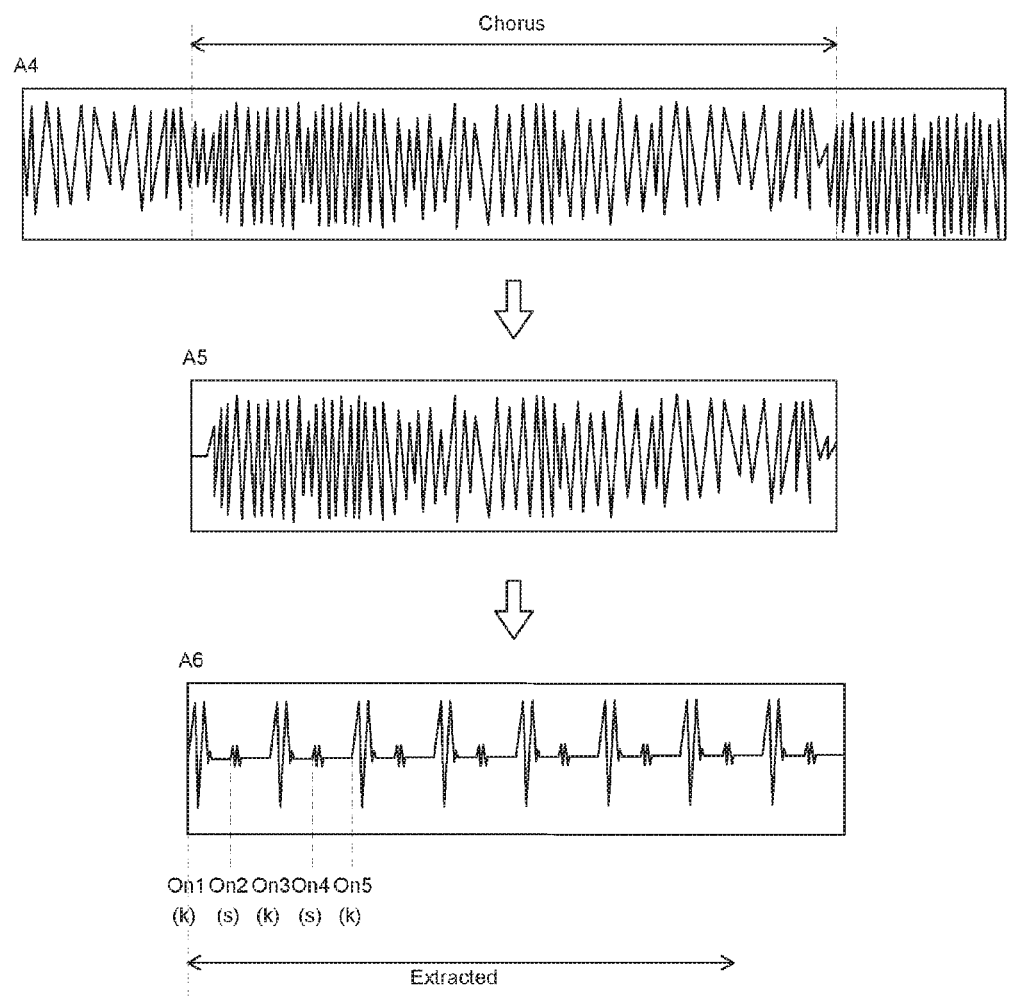
FIG. 6 is a view for illustrating extracting a representative part and determining an extracted part in the representative part in a method for creating a preview track according to an exemplary embodiment of the present disclosure.

FIG. 6 is a view for illustrating extracting a representative part and determining an extracted part in the representative part in a method for creating a preview track according to an exemplary embodiment of the present disclosure. In addition, a method for classifying various percussion instruments in rhythm data will be described in detail with reference to FIG. 6.

As described above with respect to FIG. 4, in step S410 in which a plurality of tracks is acquired, the tracks may be tracks having the full length or highlight tracks. Typically, the characteristics of each of the tracks are best represented by the representative part. The representative part may be the most well-known part of a track, for example, a refrain or a chorus. In various embodiments of the present disclosure, the representative part is detected from each of the tracks, and the extracted part may be determined from the representative part. Accordingly, the extracted part may be cut out of the representative part. The method of detecting the representative part from a track is not particularly limited, and various methods can be used. The representative part may have a time range of, for example, 7 to 10 seconds.

Referring to FIG. 6, the representative part A5 is detected from the track A4. Subsequently, rhythm data A6 is extracted from the representative part. Percussive components are separated from the rhythm data A6, and the onset of each percussive components are detected. The beginnings of the percussive components in the rhythm data A6 are recognized as onsets On1, On2, . . . , On5. Depending on the characteristics of the onsets, it is determined whether each of the percussive components is a kick, a snare or a tom-tom. For example, an onset determined as a low frequency may be classified as a kick (k), and an onset determined as a relatively high frequency may be separated as a snare (s). In FIG. 6, the onsets On1, On3 and On5 are determined as kicks (k), and the onsets On2 and On4 are determined as the snares (s). In addition, the position and intensity of the percussive components may also be considered in the separation operation. Further, the tempo of the tracks can be estimated based on the onsets or percussive components. For example, the tempo is estimated based on the temporal positions of the kicks or snares.

Once the separation of the percussive components and determination of the tempo are completed, the extracted parts can be determined in the representative part based on the percussive components and the tempo. Referring to FIG. 6, two bars according to the tempo estimated from the first kick (k) (which may be determined by, for example, six beats or eight beats depending on a piece of music) are determined as the extracted parts. The number of bars to be extracted may vary depending on the estimated tempo. For example, the extract parts may have more bars when the temp is faster.

The representative part is the most known part of a track. The extracted part is cut out at the beginning of the representative part, and a plurality of representative portions is naturally connected. Therefore, it helps the user select the playlist.

Figure 7:
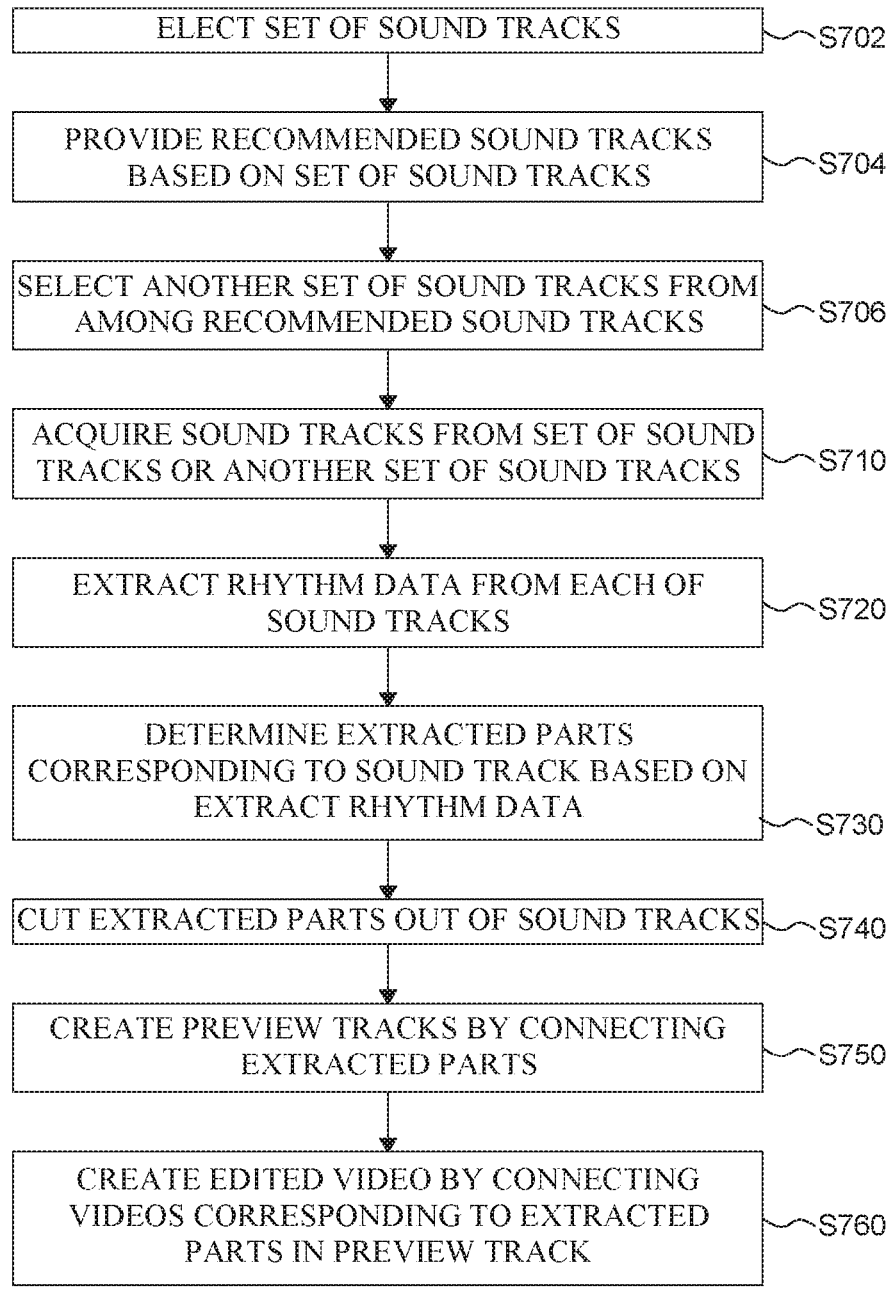
FIG. 7 is a flowchart for illustrating a method for creating a preview track according to another exemplary embodiment of the present disclosure.

FIG. 7 is a flowchart for illustrating a method for creating a preview track according to another exemplary embodiment of the present disclosure. FIGS. 8A to 8E are views for illustrating a user interface according to a method for creating a preview track according to another exemplary embodiment of the present disclosure. Hereinafter, a method for creating a preview track according to another exemplary embodiment of the present disclosure will be described with reference to FIGS. 7 to 8E in light of a user interface and user experience.

Figure 8A:
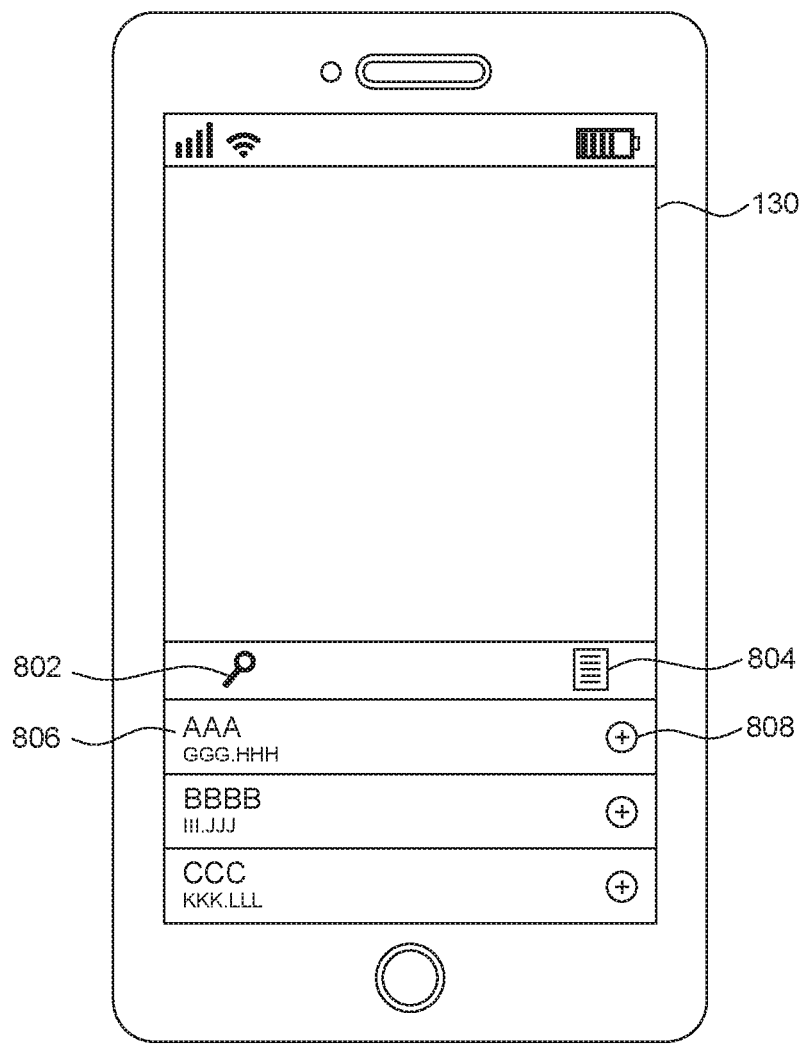
FIGS. 8A to 8E are views for illustrating a user interface according to a method for creating a preview track according to another exemplary embodiment of the present disclosure.

First, a set of tracks is selected (step S702). Referring to FIG. 8A, the display unit 130 displays a page for selecting tracks included in a playlist. The upper part of the page displays a selected track, and the lower part of the page selects a track. At the lower part of the page, there may be a button 802 for triggering a search for a track, and a button 804 for displaying a list of tracks which have already been selected. In addition, tracks 806 which are searched for or included in the list are displayed, and a button 808 for adding the tracks 806 to the playlist is also displayed. In FIG. 8A, one of the tracks 806 may be selected via a touch screen. The selected track may be played. The selected tracks may be defined as a set of tracks. The set of tracks are selected by a user and may be different from tracks selected by recommendation. The tracks selected by the recommendation may be referred to as another set of tracks.

Figure 8B:
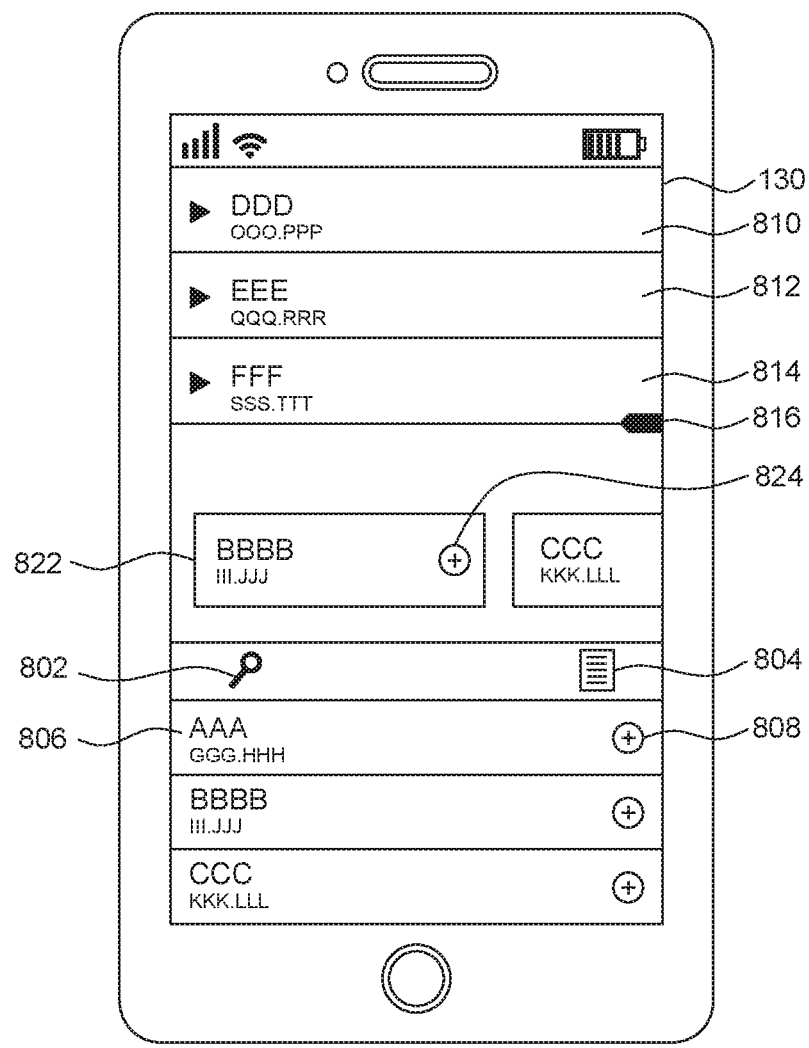

Subsequently, recommended tracks are provided based on the set of tracks (step S704). Referring to FIG. 8B, the set of selected tracks 810, 812 and 814 is displayed on the display unit 130. Like in the page shown in FIG. 8A, the tracks 806 may be added by the add button 808 through the search button 802 or the list display button 804. In FIG. 8B, a recommended track 822 is additionally displayed. The recommended track 822 is recommended based on the set of tracks 810, 812 and 814. The manner in which the recommended track 822 is determined based on the set of tracks 810, 812 and 814 is not particularly limited. If the recommended track 822 is selected, it may be played. If a recommended track add button 824 is selected, the recommended track 822 is added to the playlist as another set of tracks (step S706). The recommended track 822 may be changed to the next recommended track 822, for example, through a sweeping operation. The playlist can be completed by selecting the tracks in FIGS. 8A and 8B.

Referring to FIG. 8B, a mark 816 is displayed. The mark 816 is an indicator for indicating the tracks to be included in a preview track in the playlist. For example, three tracks 810, 812 and 814 above the mark 816 may be determined as tracks to be included in the preview track. The user can change the tracks to be included in the preview track through a drag operation or the like, and also can change the order in which they are played in the preview track. In addition, the user may change the number of tracks to be included in the preview track by moving the mark 816. The tracks included in the preview track may be selected from the set of tracks selected by the user or another set of tracks including the recommended tracks.

Subsequently, the plurality of selected tracks is acquired (step S710). Rhythm data is extracted from each of the acquired tracks (step S720). A plurality of extracted parts corresponding to the respective tracks is determined based on the extracted rhythm data (step S730). The extracted parts are cut out of the respective tracks (step S740). Subsequently, the plurality of extracted parts are connected with one another to create the preview track (step S750). Since steps S710 to S750 are substantially identical to steps S410 to S450 described above in FIG. 4, the redundant description is omitted.

Subsequently, in the preview track, a plurality of videos corresponding to the respective extracted parts is connected with one another, such that an edited video can be created. Previously, a playlist has been displayed by borrowing the cover of a representative album or displaying a photograph selected by the user. In contrast, in the method for creating a preview track according to another embodiment of the present disclosure, an edited video associated with a preview track may also be provided.

Figure 8C:
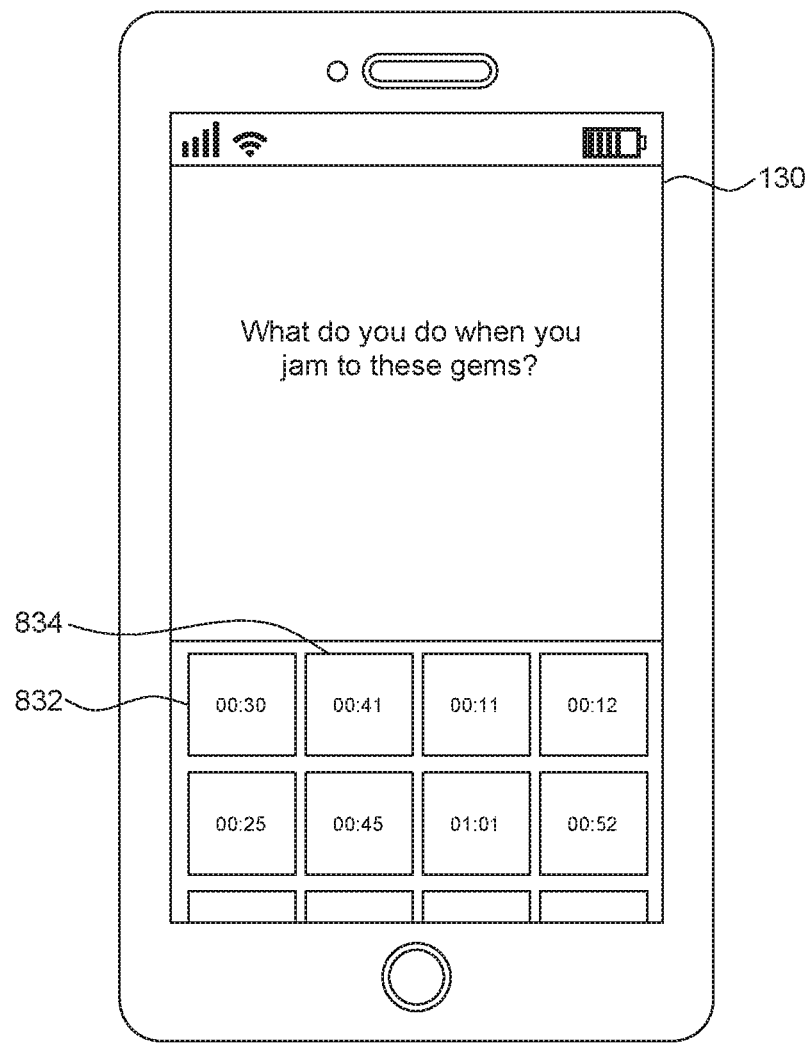

Referring to FIG. 8C, the display unit 130 displays a page after a playlist is created. After the playlist is created, for example, clips 832 and 834 of videos stored in the device may be displayed. A preview may be provided when the clips 832 and 834 of videos are selected. When one of the clips 832 and 834 is selected, it is provided with the created preview track.

Figure 8D:
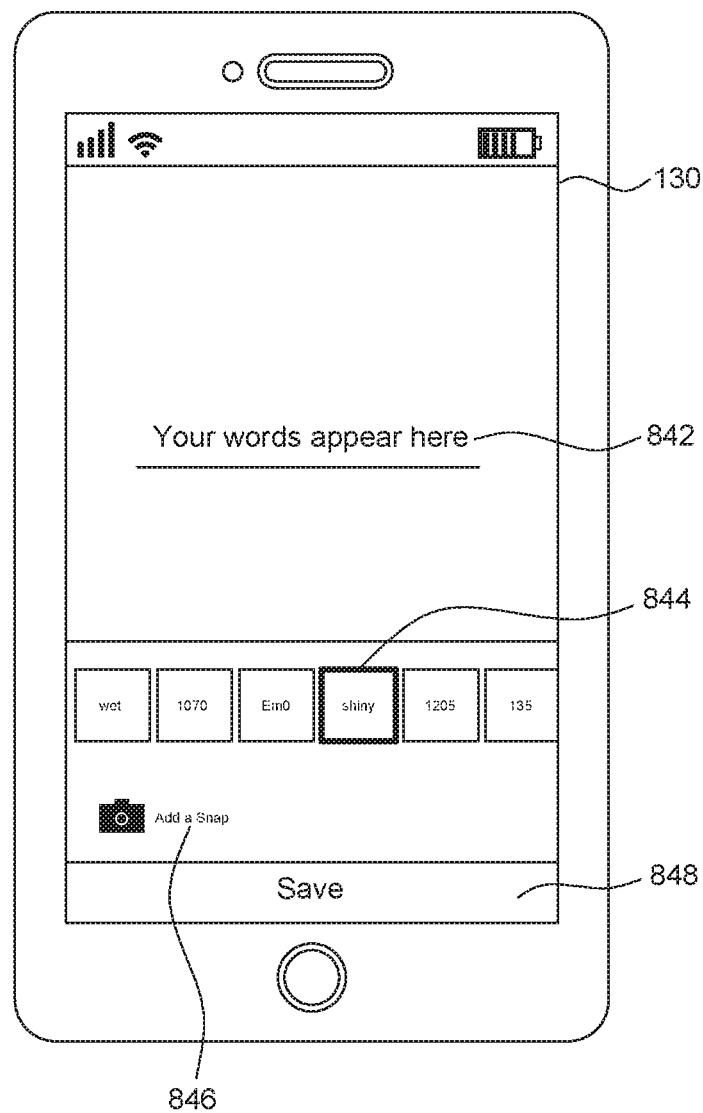

Referring to FIG. 8D, after a video is selected, a page for applying a visual effect is displayed. An area 842 for entering a phrase to be inserted into the video is provided, and the selected video may be provided behind the area as a preview. Effects 844 to be applied to the video may also be provided as a preview format. For example, various visual effects 844 such as wet, 1970, shiny, bounce, glitchy, and reverse playback can be provided. Further, a button 846 for selecting or modifying videos or videos may be provided.

After the visual effects 844 are selected, the preview track and the corresponding edited video may be stored through a Save button 848. According to another exemplary embodiment of the present disclosure, a method for creating preview track provides visual effects in associated with the preview track, such that the playlist can be described and displayed more effectively.

Figure 8E:
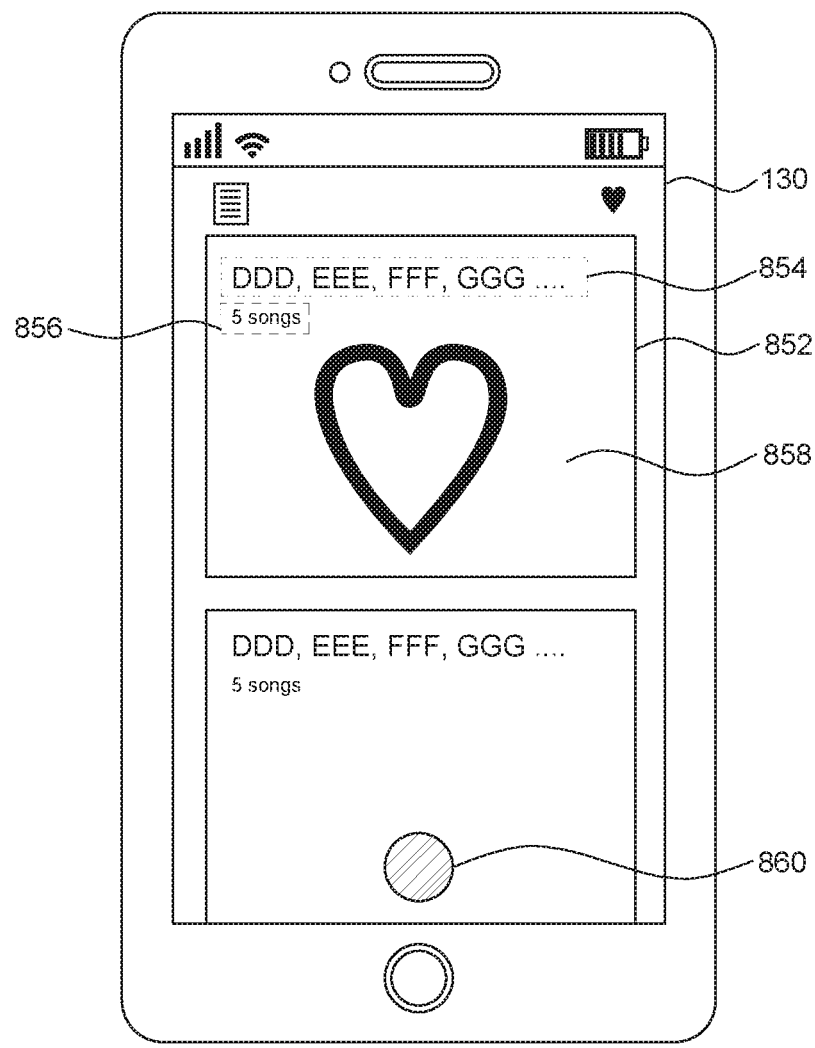

Referring to FIG. 8E, the plurality of playlists created by the above-described processes are displayed on the display unit 130. The playlist 852 may display the edited video 858, the artists 854 included in the playlist, and the number of tracks in the playlist 856. When the playlist is selected on the page, the created preview track is played. When a playlist addition button 860 is selected, step S702 can be carried out again to create a playlist and a preview track. In addition, since the edited video corresponding to the preview track is also being played, the user can intuitively know what kind of tracks are included even without watching the list of songs included in the playlist, and can determine if it is the playlist she/he user wants.

Figure 9:
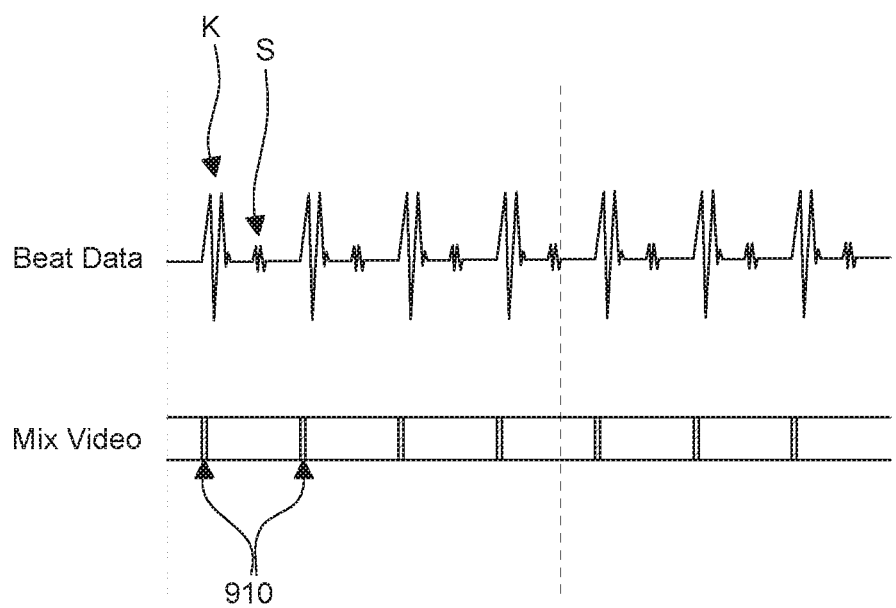
FIGS. 9 and 10 are views for illustrating a method for creating a preview track according to various exemplary embodiments of the present disclosure.

FIG. 9 is a view for illustrating a method for creating a preview track according to various exemplary embodiments of the present disclosure. Referring to FIG. 9, a timeline of rhythm data including kicks K and snares S and an edited video are shown. The edited video may have various visual effects as described above with respect to FIG. 8D. According to various embodiments, the visual effects may be synchronized to the edited video. FIG. 9 shows visual effects synchronized with the edited video such that the effects appear whenever the kicks K appear. However, the visual effects are not limited to the kicks K, but may be set to correspond to different visual effects depending on the intensity and position of a plurality of percussion instruments.

Figure 10:
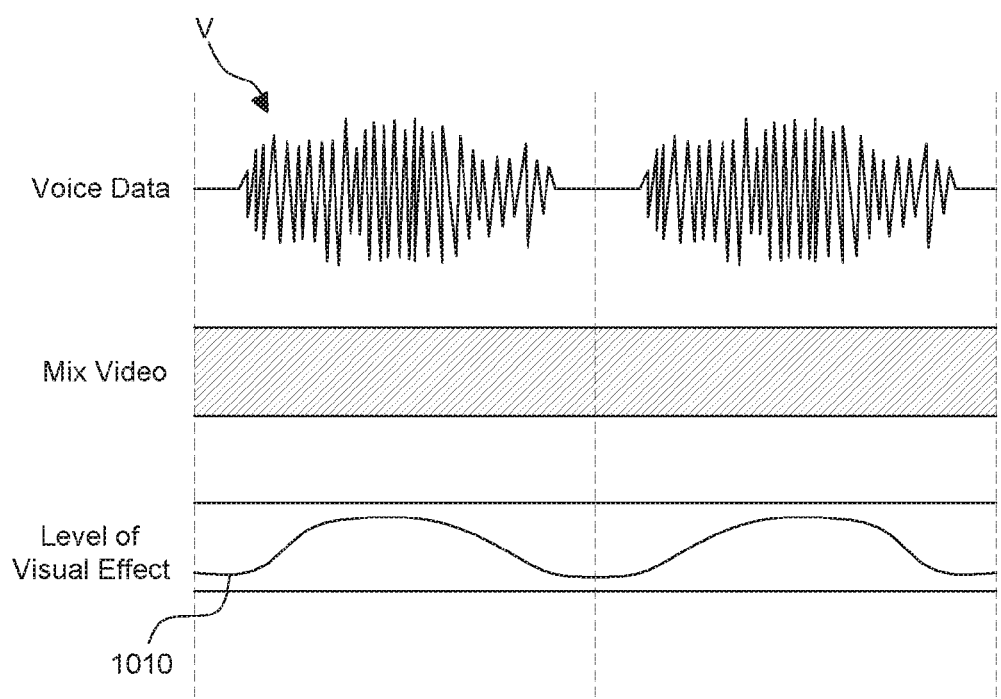

In various embodiments of the present disclosure, the video itself, rather than the visual effect, may have an image change corresponding to the rhythm data. For example, when a track has a specific tempo, tempo images having visual changes at that specific tempo may be collected, and such tempo images can be used as the edited video of the corresponding tracks. By applying the video in which visual effects or tempo are the same/similar to the preview track, a high-quality preview edited video, comparable to commercial music videos, can be produced FIG. 10 is a view for illustrating a method for creating a preview track according to various exemplary embodiments of the present disclosure. In various embodiments of the present disclosure, the visual effects applied to the edited video may be determined depending on whether a voice V is included in each of the plurality of tracks. In addition, if there is a voice V, visual effects may be applied to the edited video based on the pitch of the voice V. For example, when a specific visual effect is applied to an edited video, the effect applied when the pitch of the voice V is low is relatively weak, while the effect applied when the pitch of the voice V is high is relatively strong. Referring to FIG. 10, the level of the visual effect applied according to the pitch of voice data is set to gradually increase or decrease.

Thus far, exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The technical idea of the present disclosure is not limited by the exemplary embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A method for creating a preview track, the method comprising:
   acquiring a plurality of tracks from sound data;
   extracting rhythm data from each of the tracks;
   determining a plurality of extracted parts each corresponding to the respective tracks based on the extracted rhythm data;
   cutting out the extracted parts from the respective tracks; and
   creating a preview track by connecting the extracted parts with one another,
   wherein the extracting the rhythm data comprises:
      separating percussive components from each of the plurality of tracks;
      detecting an onset of the percussive components; and
      detecting a kick and/or a snare from the percussive components based on the onset.

2. The method of claim 1, further comprising: before the acquiring the plurality of tracks,
   selecting a set of tracks;
   providing recommended tracks based on the set of tracks; and
   selecting another set of tracks from among the recommended tracks,
   wherein the acquiring the plurality of tracks comprises acquiring the plurality of tracks from the set of tracks or the another set of the tracks.

3. The method of claim 1, further comprising:
   detecting a representative part from each of the tracks,
   wherein the determining the plurality of extracted parts comprises determining the plurality of extracted parts in the representative part, and
   wherein the cutting out the extracted parts comprises cutting the extracted parts out of the representative part.

4. The method of claim 1, wherein the extracting the rhythm data comprises
   determining a tempo based on the onset or the percussive components.

5. The method of claim 4, wherein the determining the plurality of extracted parts comprises determining based on the tempo a part for a predetermined number of bars as the extracted parts.

6. The method of claim 1, wherein the determining the plurality of extracted parts comprises
   determining the extract parts based on the kick and/or the snare.

7. The method of claim 1, wherein the determining the plurality of extracted parts comprises
   determining the plurality of extracted parts based further on whether a voice is included in each of the plurality of tracks or on a pitch of a voice if any.

8. The method of claim 1, wherein the creating the preview track comprises creating the preview track such that it has a series of consecutive beats.

9. The method of claim 1, wherein each of the plurality of tracks is a highlight track that is a part of the respective tracks.

10. The method of claim 1, further comprising:
    creating an edited video by connecting a plurality of videos with one another, each corresponding to the respective extracted parts in the preview track.

11. The method of claim 10, further comprising:
    synchronizing visual effects with the plurality of videos based on the rhythm data.

12. The method of claim 10, wherein the creating the edited video comprises determining whether a voice is included in each of the plurality of tracks, and applying visual effects to the plurality of videos based on a pitch of a voice, if any.

13. A device for creating a preview track, comprising:
    a communications unit configured to receive sound data;
    a processor operably connected to the communications unit and configured to:
       acquire the plurality of tracks from the sound data;
       extract rhythm data from each of the tracks;
       determine a plurality of extracted parts each corresponding to the respective tracks based on the extracted rhythm data;
       cut the plurality of extracted parts out of the respective tracks; and
       connect the extracted parts with one another to create a preview track; and
    an output unit configured to output the preview track,
    wherein the processor is further configured to:
       separate percussive components from each of the plurality of tracks;
       detect an onset of the percussive components; and
       detect a kick and/or a snare in the percussive components based on the onset to extract the rhythm data.

14. The device of claim 13, wherein the processor is configured to extract the rhythm data by determining a tempo based on the onset or the percussive components.

15. The device of claim 14, wherein the processor is configured to determine based on the tempo a part for a predetermined number of bars as the extracted parts.

16. The device of claim 13, wherein the preview track has a series of consecutive beats.

17. The device of claim 13, wherein the processor is further configured to create an edition video by connecting a plurality of videos with one another, each corresponding to the respective extracted parts in the preview track.

* * * * *

UNITED STATES PATENT AND TRADEMARK OFFICE
CERTIFICATE OF CORRECTION

PATENT NO. : 9,990,911 B1
APPLICATION NO. : 15/607285
DATED : June 5, 2018
INVENTOR(S) : Jungsuk Lee et al.

It is certified that error appears in the above-identified patent and that said Letters Patent is hereby corrected as shown below:

On the Title Page

Item (71), Correct Applicant name from BUZZMUISQ INC. to BUZZMUSIQ INC.

Signed and Sealed this
Twenty-fifth Day of February, 2020

Andrei Iancu
*Director of the United States Patent and Trademark Office*